United States Patent
Rabinowitz

(10) Patent No.: US 12,537,073 B2
(45) Date of Patent: Jan. 27, 2026

(54) GENETIC MODEL VALIDATION METHODS

(71) Applicant: THEMBA INC., San Carlos, CA (US)

(72) Inventor: Matthew Rabinowitz, San Francisco, CA (US)

(73) Assignee: THEMBA INC., San Carlos, CA (US)

( * ) Notice: Subject to any disclaimer, the term of this patent is extended or adjusted under 35 U.S.C. 154(b) by 162 days.

(21) Appl. No.: 17/907,628

(22) PCT Filed: Mar. 31, 2021

(86) PCT No.: PCT/US2021/025172
§ 371 (c)(1),
(2) Date: Sep. 28, 2022

(87) PCT Pub. No.: WO2021/202732
PCT Pub. Date: Oct. 7, 2021

(65) Prior Publication Data
US 2023/0223102 A1  Jul. 13, 2023

Related U.S. Application Data

(60) Provisional application No. 63/002,694, filed on Mar. 31, 2020.

(51) Int. Cl.
*G16B 20/00* (2019.01)
*G16H 10/60* (2018.01)
*G16H 50/20* (2018.01)

(52) U.S. Cl.
CPC .............. *G16B 20/00* (2019.02); *G16H 10/60* (2018.01); *G16H 50/20* (2018.01)

(58) Field of Classification Search
CPC ........ G16B 20/00; G16H 10/60; G16H 50/20; G16H 20/10; G16H 50/30
See application file for complete search history.

(56) References Cited

U.S. PATENT DOCUMENTS

2020/0342958 A1\* 10/2020 Mcgovern .............. G16B 20/20
2021/0104321 A1\*  4/2021 Lipsky ................... G16H 20/10

FOREIGN PATENT DOCUMENTS

| WO | WO 2014/011735 | 1/2014 | |
|---|---|---|---|
| WO | WO-2014011735 A1 \* | 1/2014 | ............ G16B 20/40 |
| WO | WO 2019/222212 | 11/2019 | |

OTHER PUBLICATIONS

International Search Report and Written Opinion issued Jul. 7, 2021 in PCT/US2021/025172.

\* cited by examiner

*Primary Examiner* — Chinyere Mpamugo
(74) *Attorney, Agent, or Firm* — Greenberg Traurig, LLP

(57) ABSTRACT

Disclosed are methods for evaluating genetic models that are predictive of autoimmune disease phenotype or status. The methods comprise obtaining genotype data from bone marrow transplant recipients and donors. The autoimmune disease phenotype of the transplant recipient after the transplantation may be used evaluate the effect of genotype on the autoimmune disease. Phenotype comparisons may be made to the transplant donor and/or the transplant recipient prior to the transplantation. The methods may be used to validate genetic models associated with autoimmune disease. The genetic models may be based on one or more genetic variants associated with susceptibility to or protection from an autoimmune disease.

19 Claims, 2 Drawing Sheets

GENETIC MODEL VALIDATION METHODS

CROSS REFERENCE TO RELATED APPLICATIONS

This application claims the benefit of U.S. Provisional Application No. 63/002,694, filed on Mar. 31, 2020, which is incorporated herein by reference in its entirety.

FIELD

Described are methods for validating genetic models.

BACKGROUND

Non-human animal models for autoimmune diseases do not translate well to humans. Thus, there is a need in the art for better methods to validate genetic prediction models.

SUMMARY

Provided herein are methods comprising: (a) obtaining a first dataset that comprises retrospective genotype and autoimmune phenotype data for a bone marrow recipient; (b) applying, to the first dataset, a genetic model that is predictive of whether a subject will possess the autoimmune phenotype; (c) obtaining a second dataset that comprises retrospective genotype and autoimmune phenotype data from a bone marrow donor; (d) applying the genetic model to the second dataset; and (e) validating the accuracy of the genetic model based on the autoimmune phenotype of the bone marrow recipient after, and optionally also before, a bone marrow transplant.

Also provided herein are methods comprising: (a) applying a genetic model to a bone marrow recipient based on (i) a genotype of the recipient and (ii) an autoimmune phenotype of the recipient; (b) applying the genetic model to a bone marrow donor based on (i) a genotype of the donor and (ii) an autoimmune phenotype of the donor; (c) identifying (i) an increase or decrease in the autoimmune phenotype of the recipient after receiving a bone marrow transplant, and/or (ii) the presence or absence of the autoimmune phenotype in the recipient after receiving the bone marrow transplant; and (d) validating the genetic model based on the results of (a)-(c).

Also provided are methods comprising: (a) receiving, from a first dataset, data related to a bone marrow recipient genotype and autoimmune phenotype; (b) receiving, from a second dataset, data related to a bone marrow donor genotype and autoimmune phenotype; (c) receiving, from a third dataset, data related to a genetic model for predicting autoimmune phenotypes; (d) classifying whether the genetic model accurately predicts (i) whether the autoimmune phenotype in the recipient will increase or decrease following a bone marrow transplant, and/or (ii) the presence or absence of the autoimmune phenotype in the recipient after receiving the bone marrow transplant; and (e) outputting a validation score for the genetic model.

In some aspects, the autoimmune phenotype data in the first dataset includes data from before and/or after the bone marrow transplant, and/or wherein the autoimmune phenotype data in the second dataset includes data from before the bone marrow transplant.

In some aspects, the recipient had one or more genetic variants associated with susceptibility to the autoimmune phenotype, and the donor had hematopoietic stem cells that (i) contain one or more genetic variants protective against the autoimmune phenotype, and/or (ii) do not contain one or more genetic variants associated with susceptibility to the autoimmune phenotype.

In some aspects, the autoimmune phenotype is associated with an autoimmune disorder comprising Inflammatory Bowel Disease, Crohn's Disease, Ulcerative Colitis, Multiple Sclerosis, Rheumatoid Arthritis, Type 1 Diabetes mellitus, Eosinophilic Esophagitis, Celiac, Psoriasis, or Lupus.

In some aspects, the first dataset includes data associated with the age and/or gender of the recipient, and/or the second dataset includes data associated with the age and/or gender of the donors.

Some aspects comprise collecting samples from one or more transplant centers and/or performing whole genome analysis on samples collected from one or more transplant centers. Any of the methods described herein which comprise use of a genotype (e.g., of a recipient and/or donor, before and/or after transplant) may comprise the step of performing the genotyping (e.g., whole genome analysis). Any of the methods described herein which comprise use of a phenotype may comprise the step of assessing the phenotype (e.g., of a recipient and/or donor, before and/or after transplant). Assessing the phenotype may comprise performing one or more measurements, which may be performed in vivo, ex vivo and/or in vitro.

In some aspects, the samples comprise hematopoietic stem cells from the recipients and/or the donors.

Also provided herein are methods of treating a subject having an immune disorder, the method comprising editing the genetic makeup of the subject based on a validated genetic model. In some aspects, the method comprises (a) decreasing, in one or more cells in the subject, the amount of one or more of susceptibility genetic variants and/or (b) increasing, in one or more cells in the subject, the amount of one or more protective genetic variants. Some aspects comprise administering to the subject immune cells and/or hematopoietic stem cells containing one or more protective genetic variants; and/or immune cells and/or hematopoietic stem cells that contain one or more protective genetic variants and do not contain one or more susceptibility genetic variants.

BRIEF DESCRIPTION OF DRAWINGS

FIG. 1A illustrates the power necessary to establish greater than a 35% improvement rate in an autoimmune condition with a statistical significance of $p<5\%$ against total patient population size. FIG. 1B illustrates the power necessary to establish a regression coefficient of $R>0$ with a statistical significance of $p<5\%$ against total patient population size.

DETAILED DESCRIPTION

Figure 1A:
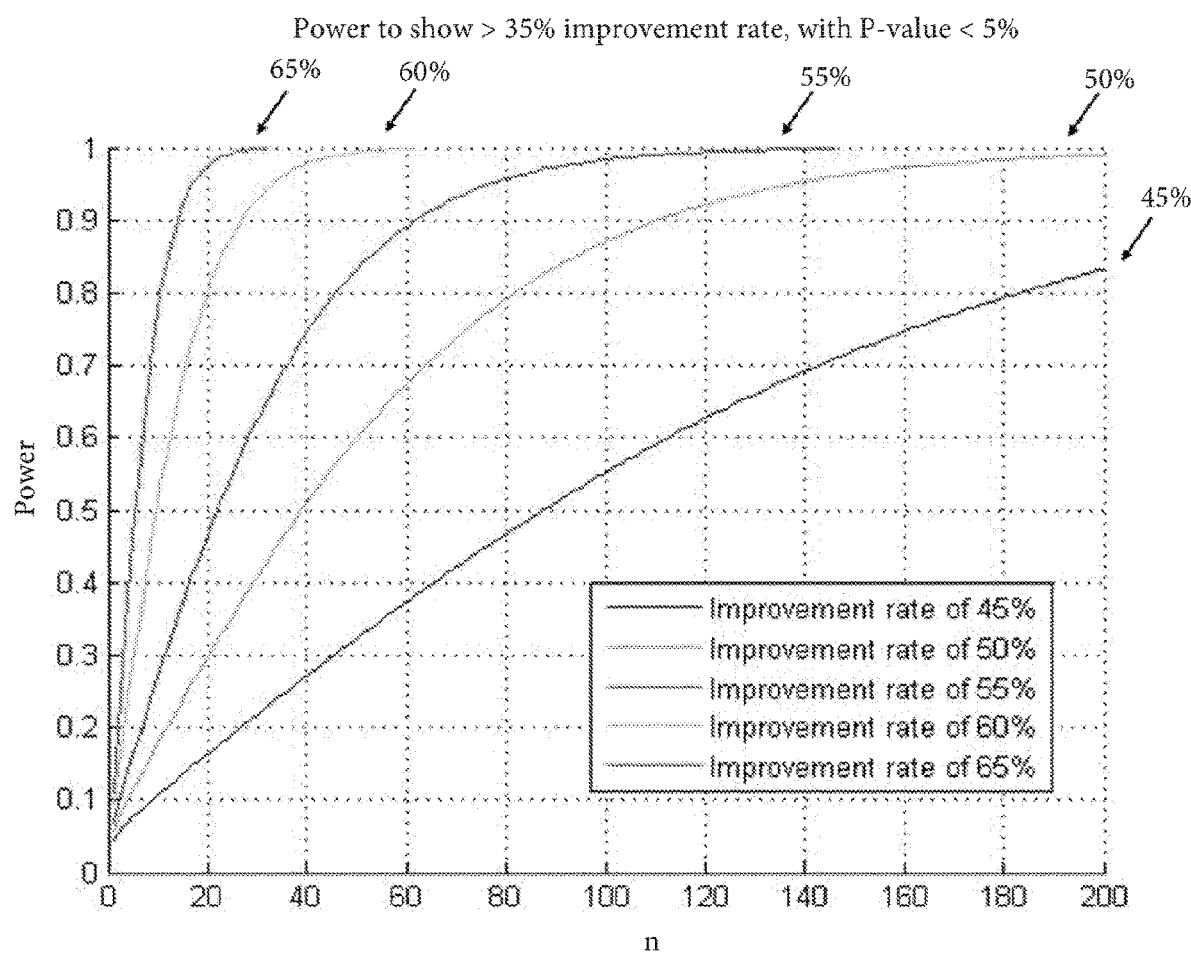
FIGS. 1A-1B show power analyses for Phase 1 (FIG. 1A) and Phases 2 and 3 (FIG. 1B) of the study described in Example 1.
Figure 1B:
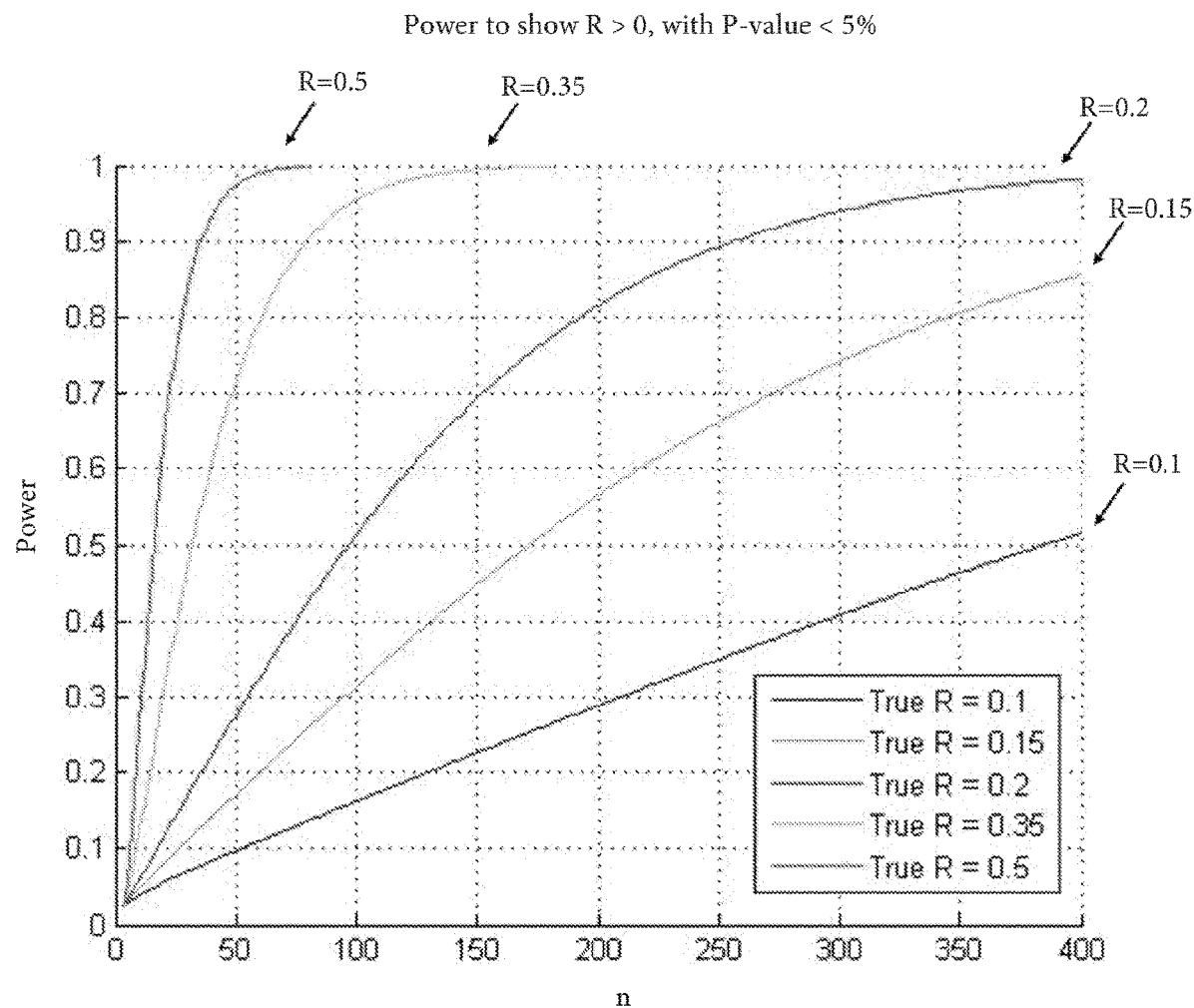

Every year, about 21,000 hematopoietic bone marrow stem cell (HSC) transplants occur in the United States. A large portion of the recipients have autoimmune conditions, secondary to the reason for their transplant. In those cases where a recipient has an autoimmune condition, such as ulcerative colitis or Crohn's, samples can be collected of the recipient and donor to perform whole genome analysis.

A polygenic predictive model can be run to determine whether the donor bone marrow is less likely to produce the autoimmune disorder than the recipient's bone marrow. This will be particularly relevant for ulcerative colitis and Crohn's, where there are protective mutations that occur at roughly 5% allele frequency and have a 3× protective effect. However, it will also be relevant to other immune conditions for which highly predictive polygenic risk score (PRS) models can be built, including type 1 diabetes, rheumatoid arthritis, psoriasis etc. Type 1 diabetes, for example, has PRS for which the area under the receiver operator curve is around 90%. By comparing the autoimmune disorder status of the bone marrow recipients before and/or after the transplant, to see if these are correlated with the predictions based on the genetics of the donor and recipient, one can determine whether the bone marrow transplant from donors with protective, or less susceptible, DNA does in fact fix the autoimmune condition. This retrospective human data is far more effective than animal data, since animal models for diseases such as inflammatory bowel disease are barely useful. This avoids animal experimentation and it might enable the FDA to allow earlier human trials of gene editing for HSC transplants for these orphan diseases such as IBD.

As used herein, the singular forms "a," "an," and "the" designate both the singular and the plural, unless expressly stated to designate the singular only.

The term "about" means that the number comprehended is not limited to the exact number set forth herein, and is intended to refer to numbers substantially around the recited number while not departing from the scope of the invention. As used herein, "about" will be understood by persons of ordinary skill in the art and will vary to some extent on the context in which it is used. If there are uses of the term which are not clear to persons of ordinary skill in the art given the context in which it is used, "about" will mean up to plus or minus 10% of the particular term.

"Expression" refers to the process by which a polynucleotide is transcribed from a DNA template (such as into a mRNA or other RNA transcript) and/or the process by which a transcribed mRNA is subsequently translated into peptides, polypeptides, or proteins. Expression of a gene encompasses not only cellular gene expression, but also the transcription and translation of nucleic acid(s) in cloning systems and in any other context. Where a nucleic acid sequence encodes a peptide, polypeptide, or protein, gene expression relates to the production of the nucleic acid (e.g., DNA or RNA, such as mRNA) and/or the peptide, polypeptide, or protein. Thus, "expression levels" can refer to an amount of a nucleic acid (e.g. mRNA) or protein in a sample.

The term "hematopoietic stem cells" or "HSCs" or "hematopoietic bone marrow stem cells" as used herein, refers to hematopoietic cells that are pluripotent stem cells or multipotent stem cells or lymphoid or myeloid (derived from bone marrow) cells that can differentiate into a hematopoietic progenitor cell (HPC) of a lymphoid, erythroid or myeloid cell lineage or proliferate as a stem cell population without initiation of further differentiation. HSCs can be obtained e.g., from bone marrow, peripheral blood, umbilical cord blood, amniotic fluid, or placental blood or embryonic stem cells. HSCs are capable of self-renewal and differentiating into or starting a pathway to becoming a mature blood cell e.g., erythrocytes (red blood cells), platelets, granulocytes (such as neutrophils, basophils and eosinophils), macrophages, B-lymphocytes, T-lymphocytes, and Natural killer cells through the process of hematopoiesis. The term "hematopoietic stem cells" encompasses "primitive hematopoietic stem cells" i.e., long-term hematopoietic stem cells (LT-HSCs), short-term hematopoietic stem cells (ST-HSCs) and multipotent progenitor cells (MPP).

The term "immune cell" as used herein generally encompasses any cell derived from a hematopoietic stem cell that plays a role in the immune response. Immune cells include, without limitation, lymphocytes, such as T cells and B cells, antigen-presenting cells (APC), dendritic cells, monocytes, macrophages, natural killer (NK) cells, mast cells, basophils, eosinophils, or neutrophils, as well as any progenitors of such cells. In certain preferred aspects, the immune cell may be a T cell. As used herein, the term "T cell" (i.e., T lymphocyte) is intended to include all cells within the T cell lineage, including thymocytes, immature T cells, mature T cells and the like. The term "T cell" may include $CD4^+$ and/or $CD8^+$ T cells, T helper ($T_h$) cells, e.g., $T_h1$, $T_h2$ and $T_h17$ cells, and T regulatory ($T_{reg}$) cells.

Autoimmune Disorders

Provided are methods for validating the accuracy of a genetic model associated with an autoimmune disorder. In some aspects, the autoimmune disorder is inflammatory bowel disease. Inflammatory bowel disease is broadly classified to include ulcerative colitis and Crohn's disease. Ulcerative colitis is a diffuse, non-specific inflammation of unknown etiology that affects the colon, and mainly invades the mucosal membrane and frequently causes erosion and ulcers. Normally, it presents with bloody diarrhea and various degrees of general symptoms. In general, it is categorized according to the spread of symptoms (pancolitis, left-sided colitis, proctitis or right-sided or segmental colitis), disease phase (such as an active phase or remission phase), severity (mild, moderate, severe) or clinical course (relapse-remission type, chronic sustained type, acute fulminant type or initial attack type). On the other hand, Crohn's disease is a disease in which granulomatous lesions accompanied by ulceration and fibrosis occur discontinuously throughout the digestive tract from the oral cavity to the anus. Although varying according to the site and range of the lesions, symptoms include fever, nutritional disorders and anemia, and systemic complications can also occur such as arthritis, iritis or liver disorders. In general, this disease is categorized according to, for example, the location of the lesions (small intestine type, small intestine-large intestine type, rectum type or gastroduodenal type) or the disease phase (such as an active phase or inactive phase).

Genetic Model

The genetic model can be any model that is predictive of the likelihood a subject (e.g., a human subject) will have an autoimmune phenotype. Examples of such genetic models are well known in the art. The genetic model can be from any known source, e.g., from the literature or formed from genotype-phenotype databases and/or gene expression databases. In some aspects the genetic model is based on the presence or absence of one or more genetic variants in a subject. The term "genetic variant" is used to refer to a version of a gene, such as a wildtype version, a mutated version, or a single-nucleotide polymorphism version. Some gene variants may be associated with increased susceptibility to an autoimmune disorder. Some gene variants may be protective against an autoimmune disorder. In some aspects, the genetic model is a polygenic risk model.

In some aspects the genetic model is based on principles set forth in PCT/US2019/032214 (WO 2019/222212), filed May 14, 2019, which is incorporated herein by reference in its entirety.

Susceptibility genes can be identified by any means, including means known in the art. For instance, in some aspects the susceptibility gene is known in the art to be associated directly or indirectly with an autoimmune disorder. In some aspects, a susceptibility gene is identified based on a family tree that includes relatives displaying or being affected by a particular phenotype. In some aspects, a susceptibility gene is identified via whole exome or whole genome sequencing of one or more family members. In some aspects, a susceptibility gene is identified via computer simulations of cellular signaling and/or computer simulations of an immune system response. In some aspects, a susceptibility gene is identified by machine modeling, such as with neural networks or other linear and nonlinear regression models and/or using gene signaling networks where particular mutations are seen to disrupt gene signaling. In some aspects, a susceptibility gene is identified using animal models (e.g., pigs or mice). In some aspects, various methods of identifying susceptibility genes (e.g., one or more of identifying known susceptibility genes, identifying particular phenotypes with reference to a family tree, and whole exome or whole genome analysis) are combined to identify an individual in need to treatment. That is, in some aspects, genes common to family members having an autoimmune disorder (e.g., a particular autoimmune disorder such as Ulcerative Colitis or Crohn's Disease) are determined to be susceptibility genes.

Non-limited examples of susceptibility genes for autoimmune diseases can include one or more variants of NADPH Oxidase Complex Genes (e.g. NCF2, Annexin A1), TTC7A, XIAP, NOD1/2, IL-10, IL-10RA, IL-10RB, Ashkenazi Jewish Genes (RPL7, CPAMD8, PRG2, PRG3, HEATR3), ATG16L1 (e.g. T300A is associated with changes in the microbiome), Asian Susceptibility Genes (TNFsf15, MHCII), ELF1, HLA-DB1*01:03, HLA-BTNL2, ARPC2, IL12B, STAT1, IRGM, IRF8, TYK2, STAT3, IFNGR2, IFNGR1, RIPK2, LRRK2, IL23R, C13orf31, ECM1, NKX2-3, TNF, JAK1, JAK2, JAK3, CARD9, NOD1/2, PTPN22, TPMT, NUDT15, LOC441108, PRDM1, IRGM, MAGI1, CLCA2, 2q24.1, and LY75.

Some aspects comprise identifying protective variants in genes. Protective genetic variants can be identified using the same techniques discussed above with respect to identifying susceptibility genetic variants. In some aspects, protective genetic variants for autoimmune disorders may comprise a G→A mutation at rs11209026 in the IL23R gene. Without being bound by theory, it is believed such a protective IL23R mutation has an Odds Ratio of roughly 1/3 for CD and UC, and will sufficiently dampen immune response to eliminate or ameliorate the symptoms of IBD. See, e.g., Duerr, Science, 314(5804): 1461-63 (2006); Sivanesan, J. Biol. Chem., 291(16): 8673-8685(2016), each of which is incorporated by reference in its entirety. In some aspects, a protective genetic variant encodes an IL23R variant with one or more of the following mutations to wildtype-IL23R: R381Q (e.g., corresponding to rs11209026, c.1142G>A), G149R, and V362I. Alternatively or additionally, in some aspects, a protective mutation (e.g., for IBD) occurs in one or more of: CARD9, NOD2, PTPN22 and SLC11A1. Without being bound by theory, it is believed that NOD2 and PTPN22 are protective for UC but are susceptibility genes for Crohn's. Also without being bound by theory, it is believed that for PTPN22, a R620W gain of function variant is associated with CD but a R263Q loss of function variant is associated with UC. In SLC11A1, the −237C/T polymorphism at SNP rs7573065 has an Odds Ratio of roughly 2/3 for Inflammatory Bowel Disease. See for example Archer, Genes and Immunity, 16(4): 275-283 (2015). In some aspects, a protective variants encode a TYK2 (tyrosine kinase 2) variant which is protective for Rheumatoid Arthritis, including alleles P1104A (rs34536443, OR=0.66), A928V (rs35018800, OR=0.53), and I684S (rs12720356, OR=0.86, P=4.6×10−7). See, e.g., Diogo, PLoS ONE 10(4): e0122271 (21 pages) (2015), which is herein incorporated by reference in its entirety. As another example, in some aspects, protective variants encode an IFIH1 variant which is protective for Type I Diabetes, with Odds Ratios ranging from 0.51 to 0.74, including alleles such as E627X. See for example Nejentsev, Science, 324(5925): 387-89 (2009), which is herein incorporated by reference in its entirety. There are many more examples of protective variants across several diseases that could be ameliorated by genetic modifications to HSCs. See for example Harper, Nat. Rev. Genetics, 16(12): 689-701 (2015), which is herein incorporated by reference in its entirety.

In some aspects, susceptibility genetic variants and protective genetic variants are determined based on one or more of: (a) the phenotype of one or more family members, sequencing a panel of genes in one or more family members, whole exome sequencing in one or more family members, and/or whole genome sequencing of one or more family members; (b) computer simulations of cellular signaling and/or an immune system response; (c) machine modeling of mutations that affect phenotypes, such as with linear and/or nonlinear regression models, neural networks; (d) data describing gene expression and/or gene signaling; and (e) animal models (e.g., pigs).

For example, machine learning techniques can be used to describe the probability of developing phenotypes based on gene mutations. Such techniques include for example linear regression models, logistic regression models, nonlinear regression models including gene or gene variant interactions, regression models using principal component analysis or restriction functions to increase constraints on the regression problem if it is under-determined or noisy due to too many possible genes, or too little patient data. Restriction functions on the regression parameters could include $L\_2$ norm as used in Ridge Regression, or $L\_1$ norm as used in the LASSO Regression. Nonlinear interactions among the genes can be captured while still maintaining a model linear in the regression parameters by logically or mathematically combining independent genetic variables to create new variables to be used in a linear model. Nonlinear interactions can also be captured using models that are nonlinear in the parameters such as Neural Networks, including Deep Learning Neural Networks, or Support Vector Machines. Several of these methods are described for example in Rabinowitz, Bioinformatics, 22: 541-549 (2006). By looking at the size of regression parameters, which is particularly simple for linear models, or by simulating different data and presenting it to nonlinear models, genes or genetic mutations having the greatest effect on the disease phenotype or risk of the disease phenotype are determined. Other techniques to identify which variants are associated with disease include tools that use gene function and gene signaling pathway data to identify genes nearby risk loci from Genome Wide Association Studies (GWAS) that are most likely causing a phenotype. See for example Pers, Nature Communications, 6, Article 5890 (9 pages) (2015), which is herein incorporated by reference in its entirety.

In addition to the references mentioned already, the following references are also noted, each of which is herein incorporated by reference in its entirety: Sands, *Inflamm. Bowel Dis.*, 23(1): 97-106 (2017); Jinek, *Science,* 337: 816-821 (2012); Salerno, *OncoImmunology,* 5(12): e1240857-1-e1240857-14 (2016); Sivanesan, *J. Biol. Chem.,* 291: 8673-85 (2016); Pidasheva, *PLOS ONE,* 6(10): e25038 (2011); SNPedia, rs11209026; US National Library of Medicine, dpSNP: rs11209026; Duerr, *Science,* 314

(5804): 1461-63 (2006); Hazlett, *Genes & Immunity*, 13: 282-87 (2012); Ferguson, *Gastroenterology Research and Practice*, Article ID 539461 (12 pages) (2010); Mu, *Biomaterials*, 155: 191-202 (2018); Angermann, *Nature Methods*, 9: 283-89 (2012); Gong, *J. R. Soc. Interface*, 14: 20170320 (13 pages) (2017); Lu, *Curr. Drug Targets*, 15(6): 565-72 (2014); Bassaganya-Riera, *Clin. Nutr.*, 25(3): 454-65 (2006).

Datasets for Genetic Model Validation

Provided are methods for validating a genetic model using data from bone marrow transplant recipients and donors. In some aspects, a first dataset is obtained that comprises genotype and autoimmune phenotype data for a bone marrow recipient. In some aspects, the genotype and/or autoimmune phenotype data is collected prior to the recipient receiving a bone marrow transplant. In some aspects, the first dataset includes the data collected after receipt of the bone marrow transplant. In some aspects, the first dataset includes data collected before and after receipt of the bone marrow transplant.

In some aspects, a second dataset is obtained that comprises genotype and autoimmune phenotype data for a bone marrow donor. In some aspects, the genotype and/or autoimmune phenotype data is collected prior to the donor donating bone marrow. In some aspects, the genotype and/or autoimmune phenotype data is collected after the donor donates bone marrow.

Genotype data can include information related to the genetic makeup of a recipient and/or donor. For instance, the data can include information related to the presence or absence of one or more genes or gene variants, or expression levels of one or more genes or gene variants. Such expression levels can identify genes that are up-regulated, down-regulated, or co-expressed in the subject. Any of the methods described herein which comprise use of a genotype (e.g., of a recipient and/or donor, before and/or after transplant) may comprise the step of performing the genotyping (e.g., whole genome analysis). Methods for genotyping are well known in the art.

Autoimmune phenotype data can include information related to the presence or absence of a disease or condition or one or more symptoms of the disease or condition. Such data can also relate to an increase or decrease in the severity of one or more symptoms. Any of the methods described herein which comprise use of a phenotype may comprise the step of assessing the phenotype (e.g., of a recipient and/or donor, before and/or after transplant). Assessing the phenotype may comprise performing one or more measurements (e.g., physiological measurements, urinalysis, blood tests, protein assays, etc.) which may be performed in vivo, ex vivo and/or in vitro (on samples obtained from subjects, such as body fluid samples). Methods for assessing phenotype are well known in the art for autoimmune diseases, including for example, Inflammatory Bowel Disease, Crohn's Disease, Ulcerative Colitis, Multiple Sclerosis, Rheumatoid Arthritis, Type 1 Diabetes mellitus, Eosinophilic Esophagitis, Celiac, Psoriasis, or Lupus.

In some aspects, the first and/or second datasets contain information related to the age and/or gender of the recipient and/or donor In some aspects, the datasets are compiled from samples collected from one or more transplant centers. In some aspects, the datasets are compiled by performing whole genome analysis on samples collected from one or more transplant centers. In some aspects the samples are bone marrow samples. In some aspects, the bone marrow samples include immune cells and/or hematopoietic stem cells. In some aspects, one or more samples may be used to assess a phenotype. A sample used to assess a phenotype may be the same sample or different sample as a sample used to determine a genotype.

Validation Model

A validation model can be created to validate the genetic models mentioned above. The model can be developed using first and second datasets as inputs. In some aspects, the genetic model mention above can be included in a validation dataset (e.g., a third dataset).

In some aspects, the validation model can be used to classify a genetic model as being predictive of a condition or phenotype. In some aspects, the validation model outputs a validation score for the genetic model. For instance, the validation model may comprise a receiver operating characteristic (ROC) curve as is well known in the art. The predictive performance of a genetic model can be scored using an area under the curve (AUC) measurement. In some aspects, the AUC can be more than about 0.75, more than about 0.8, more than about 0.85, more than about 0.9, more than about 0.95, more than about 0.97, more than about 0.98, or more than about 0.99.

Implementation Systems

The methods described here can be implemented on a variety of systems. For instance, in some aspects the system for validating a genetic model includes one or more processors coupled to a memory. The methods can be implemented using code and data stored and executed on one or more electronic devices. Such electronic devices can store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The memory can be loaded with computer instructions to train the validation model validate a genetic mode. In some aspects, the system is implemented on a computer, such as a personal computer, a portable computer, a workstation, a computer terminal, a network computer, a supercomputer, a massively parallel computing platform, a television, a mainframe, a server farm, a widely-distributed set of loosely networked computers, or any other data processing system or user device.

The methods may be performed by processing logic that comprises hardware (e.g. circuitry, dedicated logic, etc.), firmware, software (e.g., embodied on a non-transitory computer readable medium), or a combination of both. Operations described may be performed in any sequential order or in parallel.

Generally, a processor can receive instructions and data from a read only memory or a random access memory or both. A computer generally contains a processor that can perform actions in accordance with instructions and one or more memory devices for storing instructions and data. Generally, a computer will also include, or be operatively coupled to receive data from or transfer data to, or both, one or more mass storage devices for storing data, e.g., magnetic disks, magneto optical disks, optical disks, or solid state drives. However, a computer need not have such devices. Moreover, a computer can be embedded in another device, e.g., a smart phone, a mobile audio or media player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. In some aspects, a computing device is connected to other computing devices in a LAN, an intranet, an extranet, and/or the Internet. The computing device may operate in the capacity of a server machine in client-server network environment or in the capacity of a client in a peer-to-peer network environment.

Diagnosis and Treatment

In some aspects, a subject (e.g., a human subject) is diagnosed as having an autoimmune condition or disease, or being at risk of having the condition or disease or one or more symptoms thereof, based on a validated genetic model.

In some aspects, the subject is genetically susceptible to an autoimmune disorder. For instance, in some aspects the subject has one or more alleles associated with increased risk of having or developing an autoimmune disorder (i.e., a susceptibility genetic variant). Such an increased susceptibility to an autoimmune disorder can result in the subject having an increased amount of one or more protein variants associated with the autoimmune disorder (i.e., a susceptibility protein variant) as compared to a subject that does not have or is not at increased risk of developing the autoimmune disorder.

Some aspects comprise treating a subject determined to have an autoimmune condition or disease. The term "treat" is used herein to characterize a method or process that is aimed at (1) delaying or preventing the onset or progression of a disease or condition; (2) slowing down or stopping the progression, aggravation, or deterioration of the symptoms of the disease or condition; (3) ameliorating the symptoms of the disease or condition; or (4) curing the disease or condition. A treatment may be administered after initiation of the disease or condition. Alternatively, a treatment may be administered prior to the onset of the disease or condition, for a prophylactic or preventive action. In this case, the term "prevention" is used. In some aspects the treatment comprises administering a drug product listed in the most recent version of the FDA's Orange Book, which is herein incorporated by reference in its entirety. Exemplary treatments are also described PHYSICIANS' DESK REFERENCE (PRD Network 71st ed. 2016); and THE MERCK MANUAL OF DIAGNOSIS AND THERAPY (Merck 20th ed. 2018), each of which are herein incorporated by reference in their entirety.

In some aspects, subjects are diagnosed and/or treated in accordance with methods described in PCT/US2019/032214 (WO 2019/222212), filed May 14, 2019, which is incorporated herein by reference in its entirety.

EXAMPLES

Example 1: Evaluating the Impact of Donor Genotype on Autoimmune Disease in Recipients Receiving Bone Marrow Transplants Autoimmune disorders are characterized by an abnormal immune response of the body against substances and tissues normally present in the body. There are more than 80 types of autoimmune disorders, including Multiple Sclerosis ("MS"), Rheumatoid Arthritis ("RA"), Type 1 Diabetes mellitus ("T1D"), Ulcerative Colitis ("UC"), Crohn's Disease ("CD"), Eosinophilic Esophagitis, Celiac Disease, Psoriasis, Multiple Sclerosis ("MS") and Lupus. Prevailing drugs that treat immune disorders by suppressing the immune response, such as Humera®, Remicade®, and Entyvio® tend to work on less than 50% of patients, work for a limited duration and have severe side effects. Through Genome-Wide Association Studies (GWAS), several genetic variants are known of that are protective or causative for autoimmune disorders. One example is the protective G→A mutation at Single Nucleotide Polymorphism (SNP) rs11209026 in the IL23R gene, which has an Odds Ratio of roughly ⅓ for CD and UC, and may sufficiently dampen immune response to eliminate or ameliorate the symptoms of IBD. See, Duerr, Science, 314(5804): 1461-63 (2006), which is herein incorporated by reference in its entirety.

The goal of this study is to evaluate whether a change to the genetics of the immune system cells can control a subject's susceptibility to an autoimmune disorder. Polygenic Risk Scores (PRS) models are able to be created that predict susceptibility to autoimmune disorders with Area Under the ROC Curve (AUC) roughly in the range of 60% to 83%, depending on the disorder. The study demonstrates whether the autoimmune phenotype of the recipient changes after replacing the genetics of the immune cells and whether the recipient's phenotype is correlated with the autoimmune PRS's of the donor. Assuming such to be true, a product could use CRISPR-Cas9 gene editing to modify the Hematopoietic Stem Cells (HSCs) of a subject with an autoimmune condition. One approach to performing such gene editing can be by performing an autologous transplant of HSCs that are edited in vitro, following innate immune oblation of the subject, such as administering anti-c-Kit monoclonal antibodies. Stem cell transplantation has already been explored as a therapy for certain autoimmune disorders including systemic sclerosis and conditions such as Sickle Cell Anemia.

The study demonstrates how the genetics of a donor can impact the recipient of a bone marrow transplant's susceptibility to autoimmune disease, either in curing or causing the autoimmune disease. Genetic samples (blood, saliva or tissue) are collected from both the donor and recipient along with specific medical history. In Phases 2 and 3, Polygenic Risk Scores (PRS) are applied to whole genome sequencing data and compared to the recipient's autoimmune disease status.

The objectives include: i) determining whether bone marrow transplants can cure autoimmune phenotypes, (ii) determining whether the genetics of the donor affect whether an autoimmune phenotype is reduced in a recipient, and (iii) determining whether the genetics of the donor affect whether an autoimmune phenotype is caused in a recipient. These objectives will indicate whether it is justified to screen the autoimmune-related genetics of a donor, and whether gene editing of hematopoietic stems cells can cure autoimmune disorders.

The endpoints are: (i) status of a recipient's autoimmune phenotype, the later of one year after transplant or 3 months after cessation of immune suppressive therapy; (ii) correlation of recipient phenotype with PRS of the donor for recipients who have autoimmune conditions at time of transfer; and (iii) correlation of recipient phenotype with PRS of the donor for recipients who develop an autoimmune condition after transfer.

The study involves three phases, with the success of each phase serving as a gate for the subsequent phase: Phase 1: collecting outcome data for patients who have received an allogeneic transplant and have a secondary autoimmune condition; Phase 2: collecting genetic samples from recipients who had autoimmune disorders at the time of transplant and their donors, along with a control cohort who don't have autoimmune disorders, to determine if recipient phenotype is correlated with donor genotype; and Phase 3: collecting genetic samples from recipients who developed autoimmune conditions after receiving an allogeneic transplant, and their donor, to determine if the autoimmune status of the recipient is correlated with the genetics of the donor. The study focuses on immune disorders including, but not limited to: Crohn's, Ulcerative Colitis, Type 1 Diabetes, Rheumatoid Arthritis, Psoriasis, Celiac Disease, Multiple Sclerosis, and Lupus.

The study may include the use of outside repositories (such as DbGap) and patient datasets with clinical outcomes and genetic samples, such as data from transplant research centers (e.g., the Center of International Blood and Marrow Transplant Research (CIBMTR) Bio-accrual Dataset). An example of the available patient data from the CIBMTR Bio-accrual Dataset, for inflammatory bowel disease and rheumatoid arthritis, is provided in Tables 1 and 2 below. DNA extraction and Whole Genome Sequencing (WGS) is performed on samples. Further optional assays such as long-range library preparation and long-range sequencing technology may be performed to enable accurate haplotype determination.

TABLE 2

Patients received 8/8 unrelated first allo HCT, reported rheumatological or inflammatory bowel co-morbidity with paired samples available in biorepository.

| Variable | N | (%) |
|---|---|---|
| Number of recipients | 655 | |
| Number of high resolution matches out of 8 | | |
| 8 | 655 | (100) |
| Source of Data | | |
| CRF | 262 | (40) |
| TED | 393 | (60) |
| Sample available | | |
| Samples Available for Recipient and Donor | 655 | (100) |
| Disease | | |
| AML | 253 | (39) |
| ALL | 48 | (7) |
| Other leukemia | 12 | (2) |
| CML | 25 | (4) |
| MDS | 170 | (26) |
| MPN | 26 | (4) |
| Other acute leukemia | 4 | (1) |
| NHL | 47 | (7) |
| Hodgkin Lymphoma | 6 | (1) |
| Plasma Cell Disorders, MM | 14 | (2) |
| SAA | 17 | (3) |
| Inherited abnormalities of erythrocyte differentiation or function | 1 | (<1) |
| SCIDs | 24 | (4) |
| Histiocytic disorders | 5 | (1) |
| Autoimmune disorders | 2 | (<1) |
| Other | 1 | (<1) |
| Rheumatological co-morbidity | | |
| No | 267 | (41) |
| Yes | 383 | (58) |
| Missing | 5 | (1) |
| Inflammatory bowel co-morbidity | | |
| No | 363 | (55) |
| Yes | 279 | (43) |
| Missing | 13 | (2) |

TABLE 1

| Selection table | | |
|---|---|---|
| Selection Criteria | Excluded | Included |
| First allogeneic transplant in bio-accrual dataset | | N = 81,436 |
| Unrelated donors | Total number (n = 10,911) HLA-identical sibling (n = 7,096) Syngeneic (n = 83) Other relative (n = 3,302) Missing (n = 430) | N = 70,525 |
| 8/8 High Resolution HLA matched | Total number (n = 28,812) 1/8 (n = 12) 2/8 (n = 92) 3/8 (n = 413) 4/8 (n = 1,266) 5/8 (n = 2,595) 6/8 (n = 3,414) 7/8 (n = 11,603) Low/intermediate resolution (n = 9,417) | N = 41,713 |
| Rheumatological or Inflammatory bowel co-morbidity | (n = 40,648) | N = 1,065 |
| Samples available for both donor and recipients | (n = 391) | N = 674 |
| Embargoed centers | (n = 19) | N = 655 |

TABLE 2-continued

Patients received 8/8 unrelated first allo HCT, reported rheumatological or inflammatory bowel co-morbidity with paired samples available in biorepository.

| Variable | N | (%) |
|---|---|---|
| Recipient age at transplant | | |
| 0-9 years | 9 | (1) |
| 10-19 years | 27 | (4) |
| 20-29 years | 31 | (5) |
| 30-39 years | 49 | (7) |
| 40-49 years | 77 | (12) |
| 50-59 years | 183 | (28) |
| 60-69 years | 222 | (34) |
| 70+ years | 57 | (9) |
| Median (Range) | 59 | (1-78) |
| Recipient race/ethnicity | | |
| White | 592 | (90) |
| Black or African American | 14 | (2) |
| Asian | 8 | (1) |
| Native Hawaiian or other Pacific Islander | 1 | (<1) |
| American Indian or Alaska Native | 2 | (<1) |
| Hispanic | 27 | (4) |
| Missing | 11 | (2) |
| Recipient sex | | |
| Male | 309 | (47) |
| Female | 346 | (53) |
| Karnofsky score | | |
| 10-80 | 334 | (51) |
| 90-100 | 311 | (47) |
| Missing | 10 | (2) |
| Graft type | | |
| Marrow | 123 | (19) |
| PBSC | 532 | (81) |
| Conditioning regimen | | |
| Myeloablative | 308 | (47) |
| RIC | 344 | (53) |
| Missing | 3 | (<1) |
| Donor age at donation | | |
| <20 years | 31 | (5) |
| 20-29 years | 402 | (61) |
| 30-39 years | 126 | (19) |
| 40-49 years | 66 | (10) |
| 50+ years | 30 | (5) |
| Median (Range) | 27 | (18-60) |
| Donor/Recipient CMV serostatus | | |
| +/+ | 177 | (27) |
| +/− | 59 | (9) |
| −/+ | 230 | (35) |
| −/− | 183 | (28) |
| Missing | 6 | (1) |
| GvHD Prophylaxis | | |
| Ex vivo T-cell depletion | 7 | (1) |
| CD34 selection | 7 | (1) |
| Post-CY + other(s) | 23 | (4) |
| Post-CY alone | 1 | (<1) |
| Tacrolimus + MMF +− others | 110 | (17) |
| Tacrolimus + MTX +− others (except MMF) | 364 | (56) |
| Tacrolimus + others (except MTX, MMF) | 39 | (6) |
| Tacrolimus alone | 12 | (2) |
| CSA + MMF +− others (except Tacrolimus) | 42 | (6) |
| CSA + MTX +− others (except Tacrolimus, MMF) | 18 | (3) |
| CSA + others (except Tacrolimus, MTX, MMF) | 5 | (1) |
| CSA alone | 3 | (<1) |
| Other GVHD prophylaxis | 15 | (2) |
| Missing | 9 | (1) |
| Donor/Recipient sex match | | |
| Male-Male | 229 | (35) |
| Male-Female | 224 | (34) |
| Female-Male | 79 | (12) |
| Female-Female | 122 | (19) |
| Missing | 1 | (<1) |
| year of transplant | | |
| 2007 | 1 | (<1) |
| 2008 | 26 | (4) |
| 2009 | 37 | (6) |
| 2010 | 42 | (6) |
| 2011 | 58 | (9) |
| 2012 | 47 | (7) |
| 2013 | 51 | (8) |
| 2014 | 80 | (12) |
| 2015 | 61 | (9) |
| 2016 | 67 | (10) |
| 2017 | 64 | (10) |
| 2018 | 57 | (9) |
| 2019 | 50 | (8) |
| 2020 | 14 | (2) |

In Phase 1, patients are identified who had secondary autoimmune conditions at the time of allogeneic transplant, and who are either no longer receiving immune suppressive medication, or are receiving the same baseline medication as preceded their transplant regimen. The clinical status of the autoimmune conditions are collected at the later of one year after transplant, or three months after the patient stops receiving immune suppressive medication associated with the transplant. The patients are binary categorized as autoimmune symptoms improved or not improved. A significance test based on the binomial distribution is performed for each immune condition separately, and for all immune conditions combined, to determine whether the transplant improved the immune condition in significantly more than 35% of cases. Using inflammatory bowel disease as a proxy, 35% corresponds roughly to the long term efficacy of immune suppression medication, and substantially exceeds the rate at which autoimmune symptoms improve without new treatment induction. See, e.g. W. J Sandborn et al., N Eng J Med Vol 369, Num 8, Aug. 22, 2013 and W. J. Sandborn et al, N Engl J Med Vol 369, Num 8, Aug. 22, 2013; B. Sands, et al. Inflamm Bowel Dis, Vol 23, Num 1, January 2017, each of which is herein incorporated by reference in its entirety.

As shown in FIG. 1A, power analysis, using a Student-T test, is used to evaluate the power needed to demonstrate a 35% improvement rate (i.e. the fraction of patients whose autoimmune condition improve exceeds 35%) with a p-value<5% for assumed true improvement rates of 45%, 50%, 55%, 60% and 65%. For the study to have 80% power at 50% true improvement rate, 80 patients are required. For the study to have 80% power at 45% true improvement rate, 180 patients are required. Accordingly, at least 200 patients are enrolled in Phase 1 of the study, with at least 80 patients having at least one particular autoimmune phenotype.

In Phase 2, genetic samples are collected from recipients satisfying the same inclusion criteria as Phase 1, and from their donors. For each recipient's autoimmune disorder, a PRS-based risk is generated for the recipient and the donor. Each recipient is binary categorized as autoimmune symptoms improved or not, measured at the later of one year after transplant, or three months after the patient stops receiving immune suppressive medication associated with the transplant. The Pearson Correlation Coefficients are computed between the PRS-based risk of the recipient genotype and recipient phenotype ($r_r$), and between the PRS-based risk of the donor genotype and recipient phenotype ($r_d$). A Student-T test is performed for each immune condition separately, and for all immune conditions combined, to determine whether r is significantly greater than 0. Phase 2 is classified as successful if $r_d>0$ and $r_d>r_r$. It is assumed for power analysis that $r_r=0$ and the study is powered to establish the significance of $r_d>0$ for all autoimmune phenotypes combined, but not necessarily for each phenotype alone.

In Phase 3, genetic samples are collected from recipients who developed autoimmune disorders following transplant, which they did not have before transplant, and an equal number of recipients who did not develop immune disorders post-transplant. The same analysis is conducted on the combined cohort. Phase 3 is classified as successful if $r_d>0$ and $r_d>r_r$ for all immune phenotypes combined. It is assumed in powering the sample that $r_r=0$.

As shown in FIG. 2A, power analysis, using a Student-T test, is used to establish the power needed to demonstrate a Regression Coefficient R>0 with P-value<5%. The analysis is performed for a range of true R from 0.1 to 0.5. The fact that R can be related to a test statistic t* with a Student-t distribution is leveraged as follows:

$$t^* = \frac{R\sqrt{n-2}}{\sqrt{1-R^2}}$$

where n is the number of samples and the Student-t distribution has n−2 degrees of freedom. The range of R's is derived from Table 3 below, which describes the characteristics of various autoimmune PRS models, including the estimated R for each model. Based on this analysis, for a true R of 0.15, 345 subjects are required for 80% power. Accordingly, for both Phase I and Phase 2 of the study, genetic samples from a total of at least 345 subjects are collected.

TABLE 3

Characteristics of autoimmune Polygenic Risk Scores. Certain phenotypes such as glaucoma and vitiligo for which the tissue damage would be slow to repair are excluded from the study; however, these could be included in a longer study. The columns from left to right represent: the phenotype, the population in which the model is computed, the area under the ROC curve of the model, the bivariate beta or increase in log odds of the phenotype for each standard deviation of PRS score, the R2 of the model, the R of the model, the prevalence of the phenotype in the US, the prevalence of the phenotype in the UK Biobank, and the change in log odds for the phenotype based on gender. R2 was estimated according to the technique of S. H. Lee et al., Genet Epidemaiol, 2012 Apr; 36(3): 2141-24, specifically Equation (15), which is herein incorporated by reference in its entirety. This approach uses the goodness-of-fit R2 on the 0-1 scale and then transforms it to the liablility scale whilst adjusting for ascertainment.

| Phenotype | Pop | AUC | Beta | R2 | R | US_prev | ukbb_prev | log_fem_odds |
|---|---|---|---|---|---|---|---|---|
| glaucoma | EUR | 0.7475 | 0.9464 | 0.1480 | 0.3848 | 0.0200 | 0.0211 | −0.0888 |
| multiple_sclerosis | EUR | 0.5670 | 0.2341 | 0.0085 | 0.0922 | 0.0200 | 0.0044 | 0.2948 |
| psoriasis | EUR | 0.6674 | 0.5389 | 0.0772 | 0.2779 | 0.0400 | 0.0160 | −0.1412 |
| rheumatoid_arthritis | EUR | 0.5947 | 0.3450 | 0.0226 | 0.1505 | 0.0265 | 0.0122 | 0.2455 |
| celiac_disease | EUR | 0.8266 | 1.0313 | 0.2798 | 0.5289 | 0.0100 | 0.0065 | 0.2002 |
| crohns | EUR | 0.6008 | 0.3796 | 0.0178 | 0.1333 | 0.0075 | 0.0053 | 0.0119 |
| ulcerative_colitis | EUR | 0.6212 | 0.4439 | 0.0230 | 0.1516 | 0.0065 | 0.0102 | −0.0953 |
| T1D | EUR | 0.7947 | 1.5071 | 0.1079 | 0.3285 | 0.0033 | 0.0027 | −0.2046 |
| vitiligo | EUR | 0.7269 | 0.8611 | 0.0968 | 0.3111 | 0.0100 | 0.0006 | 0.1218 |
| sle (lupus) | EUR | 0.7295 | 0.5055 | 0.0301 | 0.1735 | 0.0055 | 0.0018 | 0.4645 |
| IBD | EUR | 0.6081 | 0.3869 | 0.0210 | 0.1449 | 0.0130 | 0.0141 | −0.0558 |

An internal R&D environment on cloud services which uses only HIPAA approved components and follows AWS best practices is stored in an internal network for data analysis and data monitoring.

The above disclosure is made to illustrate the invention, but it should be understood that the invention is not limited to the specific conditions or details set forth above.

What is claimed is:

1. A method comprising:
(a) compiling, by one or more computing device and based on the performing:
a first dataset that comprises genotype and autoimmune phenotype data for a bone marrow recipient prior to having received a bone marrow transplant from a bone marrow donor and retrospective genotype and autoimmune phenotype data for the bone marrow recipient after having received the bone marrow transplant from the bone marrow donor, and a second dataset comprising genotype and autoimmune phenotype data from the bone marrow donor from whom the bone marrow recipient has received the bone marrow transplant;
(b) analyzing, by the one or more computing device, the first dataset and the second dataset using a polygenic risk score (PRS) model, the analyzing comprising:
selecting, by the one or more computing device, the PRS model based on the autoimmune phenotype,
accessing, by the one or more computing device, the genotype and autoimmune phenotype data for the bone marrow recipient prior to having received the bone marrow transplant from the bone marrow donor of the first dataset, the genotype and autoimmune phenotype data from the bone marrow donor of the second dataset, and a training dataset from one or more databases, and
generating, by the one or more computing device and based on the accessing, a probability as to whether a subject will possess the autoimmune phenotype;
(c) validating, by the one or more computing device and based on the analyzing, an accuracy of the PRS model, wherein the validating comprises generating a validation score based on the autoimmune phenotype of the bone marrow recipient after receiving the bone marrow transplant from the bone marrow donor; and
(d) determining, by the computing device, whether a treatment comprising-administering an autologous gene modified stem cell transplant to the bone marrow recipient will improve a severity of one or more autoimmune symptom of the bone marrow recipient relative to a corresponding bone marrow recipient who has not received the autologous gene modified stem cell transplant based on the validation score.

2. A method comprising:
(a) applying, by one or more computing device, a bone marrow recipient dataset to a genetic model, the bone marrow recipient dataset being from a bone marrow recipient and comprising (i) a genotype of the bone marrow recipient and (ii) an autoimmune phenotype of the bone marrow recipient, the genetic model being for predicting whether a subject will possess the autoimmune phenotype based on a presence or absence of one or more genetic variants in the subject;
(b) applying, by the one or more computing device, a bone marrow donor dataset to the genetic model, the bone marrow donor dataset being from a bone marrow donor and comprising (i) a genotype of the bone marrow donor and (ii) an autoimmune phenotype of the bone marrow donor;
(c) identifying, by the one or more computing device, at least one of (i) an increase or decrease in the autoimmune phenotype of the bone marrow recipient after receiving a bone marrow transplant or (ii) the presence or absence of the autoimmune phenotype in the bone marrow recipient after receiving the bone marrow transplant;
(d) validating, by the one or more computing device and based on the identifying, an accuracy of the genetic model wherein the validating comprises generating a validation score based on the autoimmune phenotype of the bone marrow recipient after receiving the bone marrow transplant from the bone marrow donor; and
(e) determining, by the one or more computing device and based on the validation score, whether administering an autologous gene modified stem cell transplant to the bone marrow recipient will improve a severity of one or more autoimmune symptom of the bone marrow recipient relative to a corresponding bone marrow recipient who has not received the autologous gene modified stem cell transplant;
(f) administering a treatment comprising the autologous gene modified stem cell transplant to the bone marrow recipient based on the determining.

3. A method comprising:
(a) receiving, from a first dataset and by one or more computing device, data related to a bone marrow recipient genotype and autoimmune phenotype;
(b) receiving, from a second dataset and by the one or more computing device, data related to a bone marrow donor genotype and autoimmune phenotype;
(c) receiving, from a third dataset and by the one or more computing device, data related to a genetic model for predicting autoimmune phenotypes, the genetic model being for predicting whether a subject will possess the autoimmune phenotype based on a presence or absence of one or more genetic variants in the subject;
(d) classifying, by the one or more computing device and using a validation model, whether the genetic model accurately predicts at least one of (i) whether the autoimmune phenotype in the bone marrow recipient will increase or decrease following a bone marrow transplant, or (ii) the presence or absence of the autoimmune phenotype in the bone marrow recipient after receiving the bone marrow transplant, wherein the classifying is based on the autoimmune phenotype of the bone marrow recipient after receiving the bone marrow transplant from the bone marrow donor;
(e) outputting, by the one or more computing device, a validation score for the genetic model;
(f) determining, by the one or more computing device, whether administering an autologous gene modified stem cell transplant to the bone marrow recipient will improve a severity of one or more autoimmune symptom of the bone marrow recipient relative to a corresponding bone marrow recipient who has not received the autologous gene modified stem cell transplant; and
(g) administering a treatment comprising the autologous gene modified stem cell transplant to the bone marrow recipient based on the determining.

4. The method of claim 1, wherein at least one of (i) the autoimmune phenotype data in the first dataset includes data from before or after the bone marrow transplant, or ii) the autoimmune phenotype data in the second dataset includes data from before the bone marrow transplant.

5. The method of claim 1, wherein the bone marrow recipient had one or more genetic variants associated with susceptibility to the autoimmune phenotype, and wherein the bone marrow donor had hematopoietic stem cells that (i) contain one or more genetic variants protective against the autoimmune phenotype, or (ii) do not contain one or more genetic variants associated with susceptibility to the autoimmune phenotype.

6. The method of claim 1, wherein the autoimmune phenotype is associated with an autoimmune disorder comprising Inflammatory Bowel Disease, Crohn's Disease, Ulcerative Colitis, Multiple Sclerosis, Rheumatoid Arthritis, Type 1 Diabetes mellitus, Eosinophilic Esophagitis, Celiac, Psoriasis, or Lupus.

7. The method of claim 1, wherein at least one of (i) the first dataset includes data associated with an age or gender of the bone marrow recipient, or (ii) the second dataset includes data associated with an age or gender of the bone marrow donor.

8. The method of claim 1, further comprising: collecting samples from one or more transplant centers; and performing whole genome analysis on samples collected from one or more transplant centers.

9. The method of claim 8, wherein the samples comprise hematopoietic stem cells from at least one of (i) the bone marrow recipient or (ii) the bone marrow donor.

10. The method of claim 1, further comprising: treating the bone marrow recipient having an immune disorder, wherein treating the bone marrow recipient comprises editing a genetic makeup of the bone marrow recipient based on the validated genetic model.

11. The method of claim 10, wherein the method further comprises at least one of: (a) decreasing, in one or more cells in the bone marrow recipient, an amount of one or more of susceptibility genetic variants; or (b) increasing, in one or more cells in the bone marrow recipient, an amount of one or more protective genetic variants.

12. The method of claim 10, further comprising administering to the bone marrow recipient, at least one of (i) immune cells or hematopoietic stem cells containing one or more protective genetic variants or (ii) immune cells or hematopoietic stem cells that contain one or more protective genetic variants and do not contain one or more susceptibility genetic variants.

13. The method of claim 1, wherein validating the accuracy of the genetic model based on the autoimmune phenotype of the bone marrow recipient is performed before the bone marrow transplant.

14. The method of claim 2, wherein at least one of (i) autoimmune phenotype data in the bone marrow recipient dataset includes data from before or after the bone marrow transplant, or (ii) the autoimmune phenotype data in the bone marrow donor dataset includes data from before the bone marrow transplant.

15. The method of claim 2, wherein the bone marrow recipient had one or more genetic variants associated with susceptibility to the autoimmune phenotype, and wherein the bone marrow donor had hematopoietic stem cells that (i) contain one or more genetic variants protective against the autoimmune phenotype, or (ii) do not contain one or more genetic variants associated with susceptibility to the autoimmune phenotype.

16. The method of claim 2, wherein the autoimmune phenotype is associated with an autoimmune disorder comprising Inflammatory Bowel Disease, Crohn's Disease, Ulcerative Colitis, Multiple Sclerosis, Rheumatoid Arthritis, Type 1 Diabetes mellitus, Eosinophilic Esophagitis, Celiac, Psoriasis, or Lupus.

17. The method of claim 2, wherein at least one of (i) the bone marrow recipient dataset includes data associated with an age or gender of the bone marrow recipient, or (ii) the bone marrow donor dataset includes data associated with the age or gender of the bone marrow donor.

18. The method of claim 2, further comprising: collecting samples from one or more transplant centers; and performing whole genome analysis on samples collected from one or more transplant centers.

19. The method of claim 18, wherein the samples comprise hematopoietic stem cells from at least one of (i) the bone marrow recipient or (ii) the bone marrow donor.

* * * * *